No. 753,897. PATENTED MAR. 8, 1904.
H. F. MAXIM.
AUTOMATIC APPARATUS FOR EXTINGUISHING FIRE.
APPLICATION FILED APR. 7, 1902.
NO MODEL. 4 SHEETS—SHEET 1.

Witnesses.
Ella Robinson
Alice Robinson

Inventor:
Howard F. Maxim
by Almon Robinson
Atty.

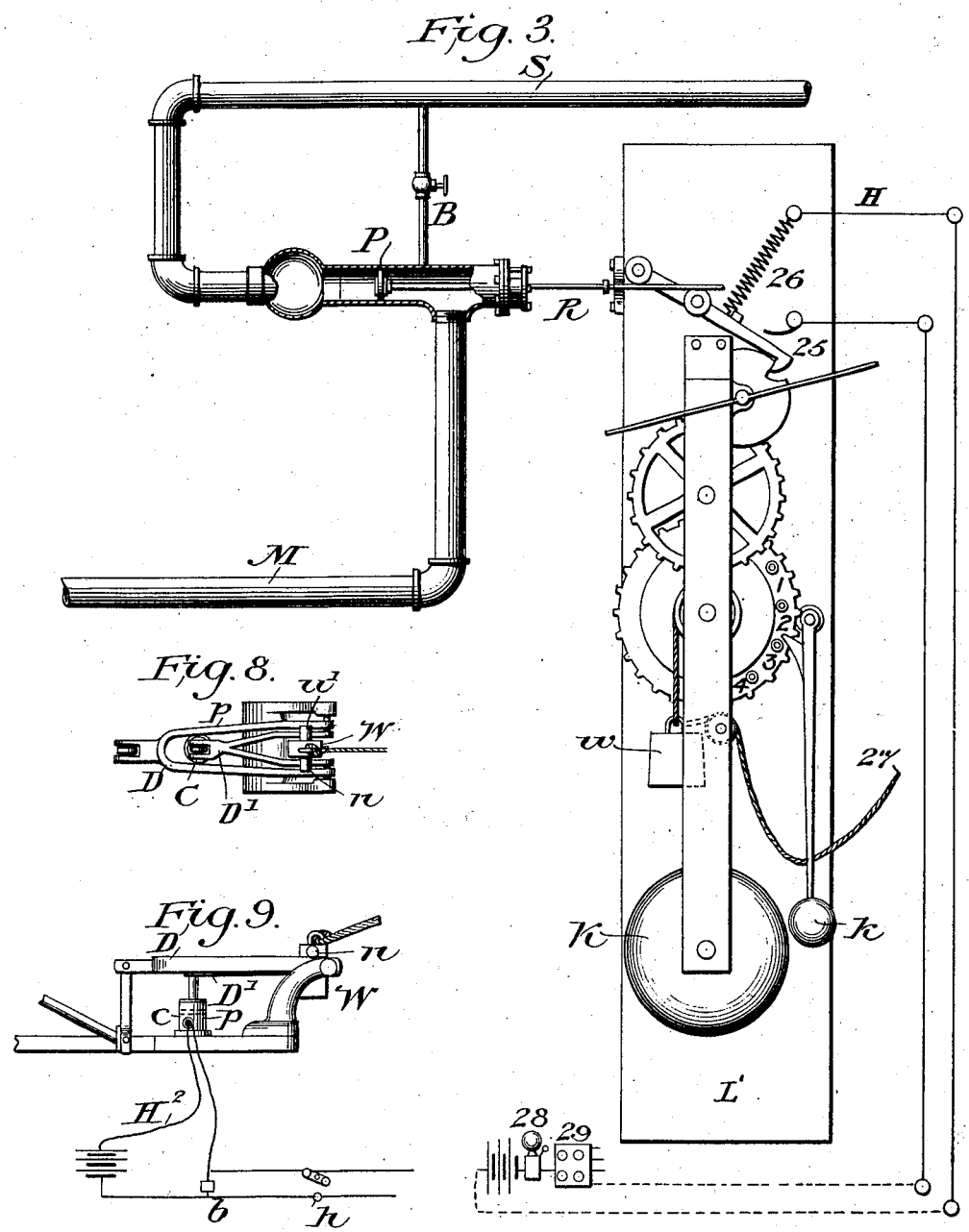

No. 753,897. PATENTED MAR. 8, 1904.
H. F. MAXIM.
AUTOMATIC APPARATUS FOR EXTINGUISHING FIRE.
APPLICATION FILED APR. 7, 1902.
NO MODEL. 4 SHEETS—SHEET 3.
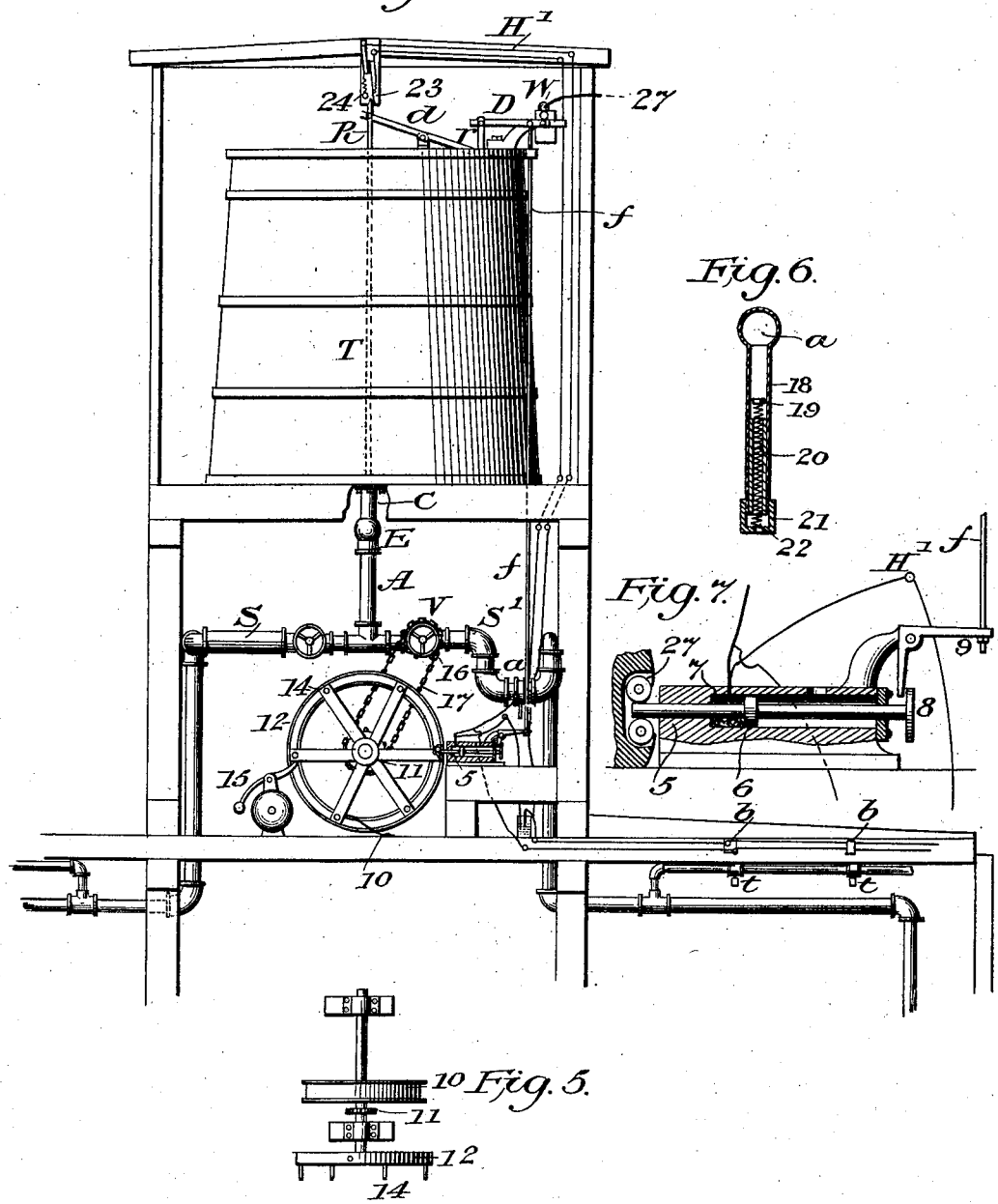

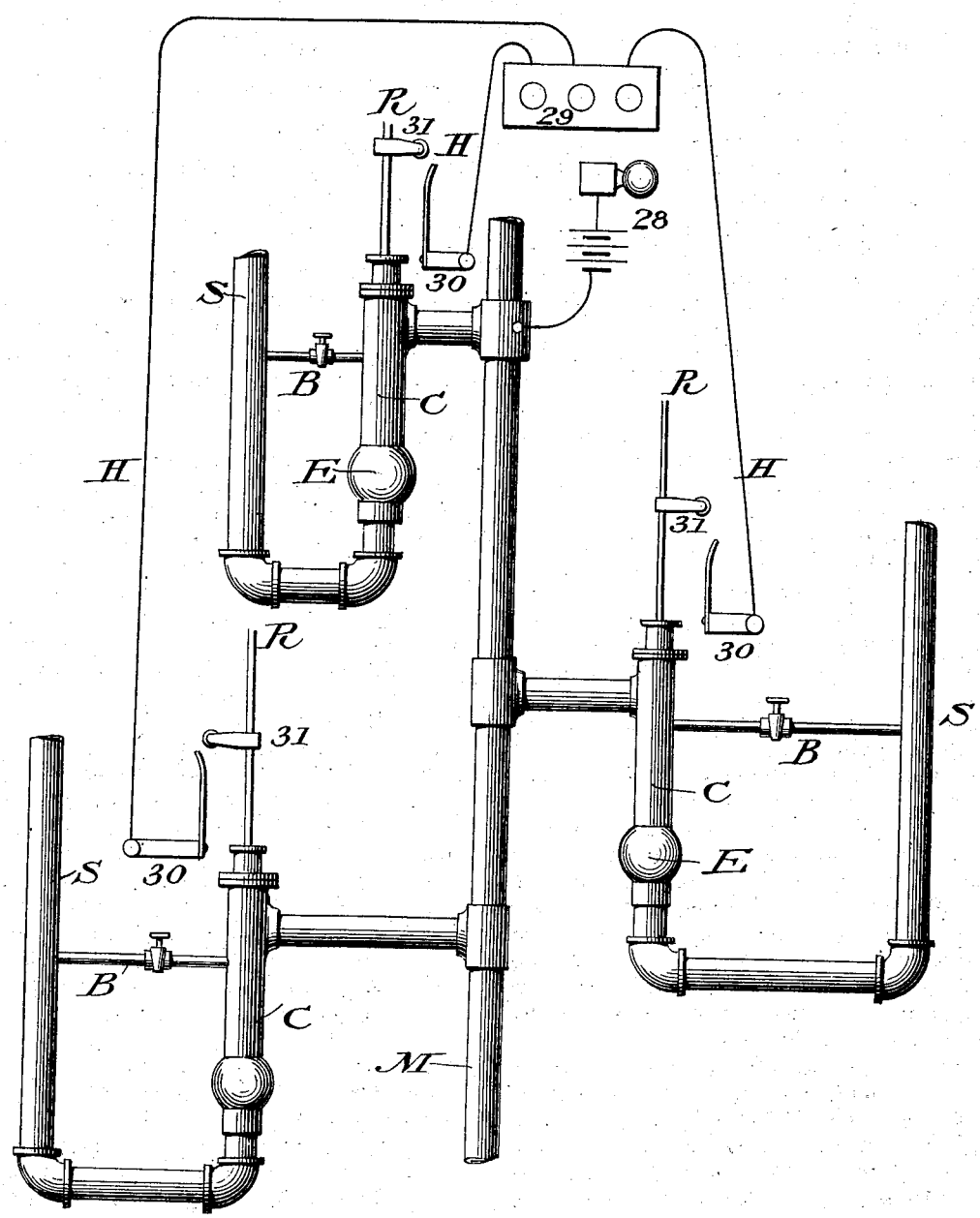

No. 753,897. Patented March 8, 1904.

UNITED STATES PATENT OFFICE.

HOWARD F. MAXIM, OF BETHEL, MAINE.

AUTOMATIC APPARATUS FOR EXTINGUISHING FIRE.

SPECIFICATION forming part of Letters Patent No. 753,897, dated March 8, 1904.

Application filed April 7, 1902. Serial No. 101,678. (No model.)

*To all whom it may concern:*

Be it known that I, HOWARD F. MAXIM, a citizen of the United States, residing at Locke's Mills, in the town of Bethel, county of Oxford, and State of Maine, have invented certain new and useful Improvements in Automatic Apparatus for Extinguishing Fire, of which the following is a specification.

My invention relates to that class of fire-extinguishing apparatus which makes use of automatic sprinklers; and in its complete form it comprises an automatic construction which sounds a series of alarms whenever water begins to flow from the sprinklers and at the same time turns the water into one or more dry pipes fitted with similar sprinklers.

My invention also provides for additional electrical control of the above-mentioned water-valves and their connected alarms.

Figure 1:
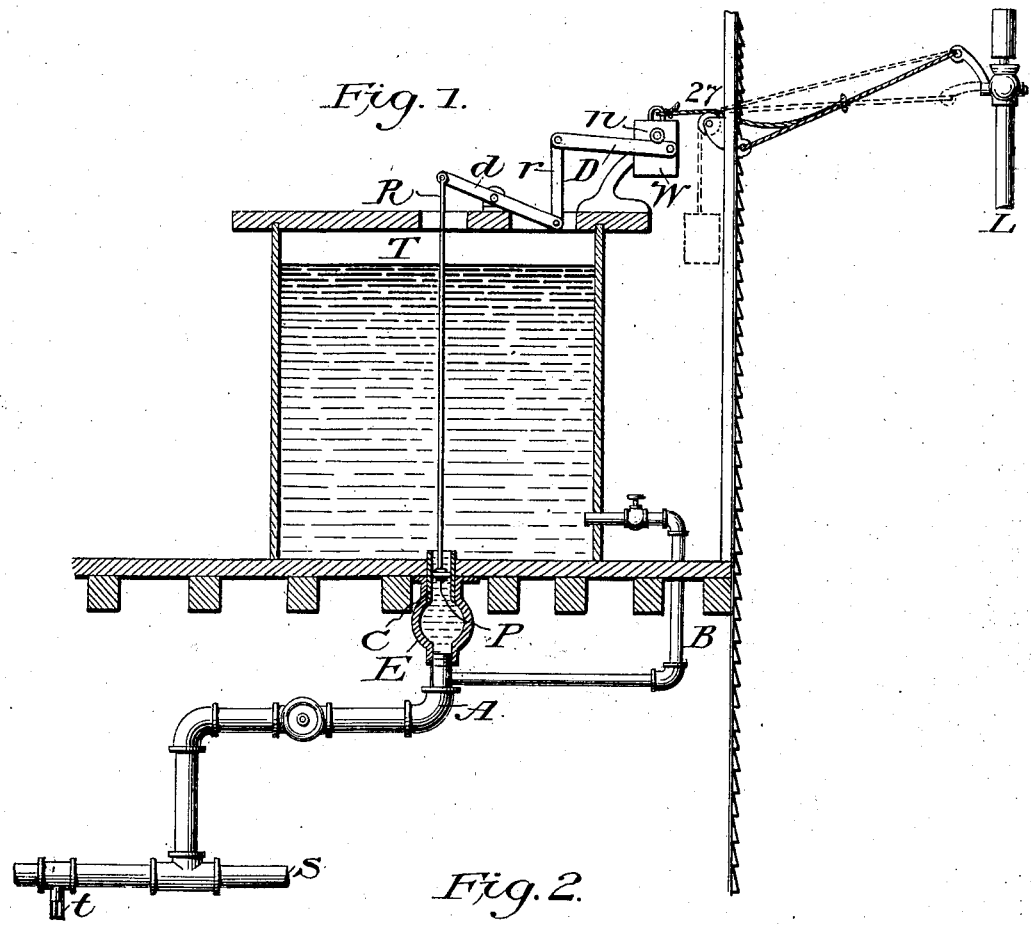
Figure 2:
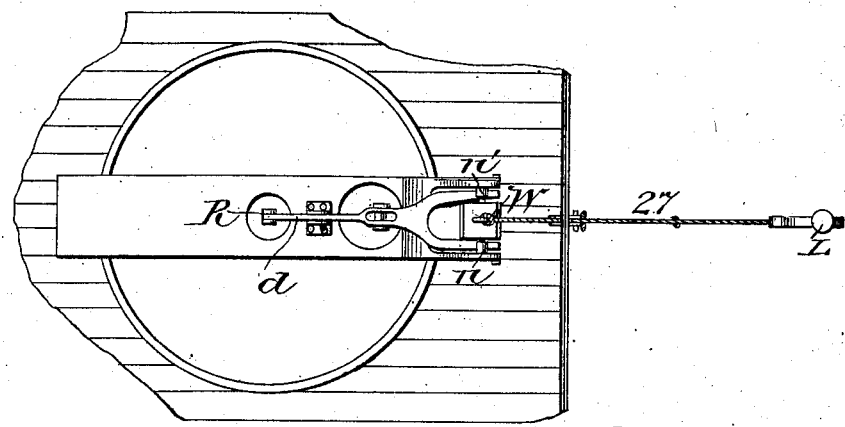

In the accompanying drawings, Figure 1 is a drawing, partly diagrammatic, showing my invention as arranged to work in connection with a water-tank and with a directly-connected steam-whistle. Fig. 2 is a corresponding plan. Fig. 3 is an elevation showing my invention as used in connection with a supply of water from outside the building. Fig. 4 is an elevation showing both full and empty pipes. Fig. 5 is a detail plan showing part of the mechanism for working the valve which controls the empty pipes. Fig. 6 is a sectional detail of an automatic valve for drawing away the drip from the valve through which the empty pipes are filled. Fig. 7 is a sectional detail of the detent and its attachments which control the opening of the valve in Fig. 4. Fig. 8 is a plan, and Fig. 9 an elevation, of an additional release for the alarm-actuating weight shown in Figs. 1 and 4. Fig. 10 shows the connection of three flow-detecting pistons with an annunciator, other parts being omitted.

In the drawings, T is a water-tank.

A is a main pipe, which may be connected with the tank T, as shown in Fig. 1, or with a source of water-supply from outside the building, as in Fig. 3.

C is a cylinder in the line of A; P a piston fitting C so as to slide water-tight with little friction.

E is an enlarged chamber into which the piston P is carried by the pressure of the water behind it when the counterbalancing pressure of the water in front of it is reduced by outflow.

S is a sprinkler-pipe, to which a series of automatic sprinklers, as $t$, are attached. As any of the sprinklers in ordinary use answer the purposes of my invention, I have not attempted to show their construction.

B is a by-pass pipe, which in Fig. 1 connects the tank T with the main pipe A and in Fig. 3 connects the main pipe M with the sprinkler-pipe S.

R is a piston-rod which connects the piston with the alarm mechanism. $d$ is a lever, and $r$ a connecting-rod, which transmit the motion of the piston-rod R to the forked lever D.

$n$ $n'$ are rollers projecting from the sides of the alarm-weight W, which rest upon the forked lever D when the piston P is in the position shown. When the piston P is sucked into the chamber E by the flow of water from the sprinkler-pipe S, the alarm-weight W rolls off and in falling into the position shown by the dotted lines pulls the alarm-cord 27 and actuates the alarm L, which may be a steam-whistle, as shown, or any other device conveniently set in motion by a falling weight. Where the alarm L is a general alarm to the neighboring community, I prefer in most cases to interpose a more local alarm or series of alarms, as shown in Fig. 3, where as the piston P moves into the chamber E the rod R releases the detent 25 and permits the spring 26 to lift it, set in motion the alarm L', and close the circuit H, thereby ringing the bell 28 and indicating on the annunciator 29 the part of the system in which the outflow of water has occurred.

In Fig. 10 each of the annunciator-circuits H is closed by the striking of the circuit-closer 31, attached to the piston-rod R against the contact-spring 30.

The clockwork-alarm L swings the hammer $k$ against the bell K by the action of the rollers 1 2 3 4, which by their number and position indicate the particular alarm sounded where there is more than one in the system. The weight $w$ as it falls pulls on the cord 27 and at last, if the outflow is not stopped, releases the general alarm L of Fig. 1.

As there are usually parts of any large establishment in which it is undesirable to keep sprinkler-pipes full of water at all times, I provide for turning water into empty pipes when needed.

S', Fig. 4, is an empty sprinkler-pipe connected with a main pipe A through the valve V. A sprocket-wheel 16 on the stem of the valve V is connected by the chain 17 with the sprocket-wheel 11, to which motion in the right direction to open the valve is imparted by the spring 10 and in the reverse direction by the hand-wheel 12, which is provided with pins 14. The valve is held closed by the detent 5, which is shown on an enlarged scale in Fig. 7.

When the piston P lifts the forked lever D, as heretofore specified, it also lifts the rod $f$. This rod $f$ enters a slot in the outer end of the bell-crank lever 9 and lifts it. As the other arm of 9 passes behind 8, the enlarged end of the detent 6, it pulls it out from between the rollers 27 and permits the spring 10 to open the valve V.

In order to provide for releasing the spring 10 when there is dangerous heat in the neighborhood of the empty pipes, I provide thermostats of any approved construction at points to be protected, as $b$, and arrange them to close an electric circuit H', which passes through an explosive charge 7 in front of the piston 6 and fires it by its heating effect. The charge 7 may be of loosely-packed guncotton or of any other explosive which can be conveniently adjusted to give the small amount of force necessary. The resistance of the part of the circuit passing through the charge is adjusted to give the necessary heating effect with the battery-power available in the circuit. As the direct mechanical connection between the piston P and the detent 5, which is shown in Fig. 4, can only be applied in that part of the system where the piston and the valve come close together, I provide for releasing valves in other parts of the system, a branch of the electric circuit H' running to the outer end of the piston-rod R, as shown in Fig. 4. When this piston-rod R is drawn down by an outward flow of water from the sprinkler-pipe S, the spring 23 closes the circuit at 24, thereby igniting the charge 7 and pushing out the detent 5. The explosion of the charge gives an alarm. To continue the alarm, I make use of the valve-closing mechanism by placing the alarm 15 where its handle will be struck by the pins 14 on the rim of the hand-wheel; but I do not limit myself to this precise construction, since where more convenient other methods of utilizing a part of the strength of the valve-closing spring for sounding an alarm will readily suggest themselves.

As it is frequently desirable to give an instantaneous alarm from points not protected by the sprinklers, I provide for it by the construction shown in Figs. 8 and 9, in which the rollers $n$ and $n'$ extend over the forked levers D D', so that the lifting of either will drop the weight W. The inner end of the forked lever D' is supported by the piston $p$, which rests upon an explosive charge in the bottom of the cylinder C, through which an electric firing-circuit $H^2$ passes. Thermostatic circuit-closers, as $b$, and circuit-closing switches, as $h$, are inserted at points from which an instantaneous alarm is desirable.

As there is liable to be a certain amount of leakage past the automatic valve V, I provide a downward bend $a$ to catch this leakage and a drainage-pipe 18, closed by an internal valve 19, held up by a spring 20, which is adjusted by a screw-cap 21, perforated at 22.

When I wish to make use of my invention in its complete form, I fit up normally full sprinkler-pipes in all those parts of the building or buildings to be protected in which their use is feasible. In places where full pipes cannot well be used I put up empty ones, connecting them, as shown in Fig. 4, by means of automatically-actuated valves with some part of the full system of piping. Where the area to be protected is extensive, and especially where it covers more than one building, I insert the pistons P, with their attached alarms, in different branches of the system and make a distinguishable difference in the alarms, as heretofore explained. I also provide by means of the construction shown in Figs. 8 and 9 for setting the principal alarm in action from danger-points which cannot be protected by sprinklers and from points at which in case of danger from outside the premises the circuit can be closed by a switch. If a fire now breaks out in the immediate neighborhood of the full pipes, the sprinklers will open and at the first flow of water the piston P, which is interposed between the sprinklers that open and their source of supply, will move, setting in action its connected alarms and the valve-opening mechanism for the empty pipes connected with that part of the system. If the fire starts near the empty pipes, the adjacent thermostats will close the firing-circuit, and thereby release the valve-opening mechanism, which turns water into the empty pipes, and thereby, through the interposed piston P, puts in action the automatic alarms and valves connected therewith. If the fire breaks out at some point not protected by sprinklers, a thermostat placed near will act through the mechanism shown in Figs. 8 and 9 to release the principal alarm, and when there is danger from fire outside the premises one or more switches placed at convenient points, as indicated in the diagram of Fig. 9, may be closed and give an instantaneous and general alarm.

If the flow of water acting on the piston P in Fig. 1 is caused by a small leak or by the starting of a single sprinkler, the piston P will not be pushed fully into the enlarged chamber E and the general alarm L will not be released by the falling of the weight W.

When the leak is stopped, I open the by-pass B and then pull the piston P back into place and close the by-pass B.

Having now fully described my invention and the manner of using it, what I claim, and desire to secure by Letters Patent, is—

1. The combination with a system of water-piping in which the inclosed water is normally at rest, of a cylinder inserted in the principal line of pipe, a piston fitting the cylinder and sliding therein, an enlarged chamber at the inner end of the cylinder into which the piston slides, an alarm, a detent releasing the alarm and a mechanical connection which transmits the motion of the piston to the detent; all as and for the purpose set forth.

2. The combination with a system of pipes which feed fire-extinguishing apparatus of a cylinder inserted in the course of one of the principal pipes, a piston which fits the cylinder, an enlarged chamber at the inner end of the cylinder, an alarm actuated by the movement of the piston, a by-pass around the cylinder and a valve controlling the flow of water through the by-pass; all as and for the purpose set forth.

3. The combination with a system of water-pipes in which the water is normally at rest, of two or more cylinders, each of which is inserted in a separate branch of the system, pistons fitting each cylinder, two or more electric circuits corresponding to the pistons and controlled by them, and a combined annunciator and alarm with which each of the circuits is connected; all combined with each other substantially as and for the purpose set forth.

4. The combination with a system of sprinkler-pipes which is normally filled with water of one or more empty sprinkler-pipes, valves admitting water from the full pipes into the empty ones, one or more pistons which intercept the flow of water into the empty sprinkler-pipes and an alarm actuated by the movement of either piston; all as and for the purpose set forth.

5. In an automatic sprinkler system one or more full pipes, one or more empty pipes branching therefrom, a thermostatically-controlled valve in each empty pipe which admits water thereto, a piston which intercepts the flow of water into both the full and the empty pipes, an alarm set in action by the motion of the piston and an enlarged chamber into which the piston passes after actuating the alarm; all in combination with each other and with a source of water-supply substantially as and for the purpose set forth.

6. In an automatic sprinkler system one or more sprinkler-pipes which are normally full of water, one or more empty sprinkler-pipes, a valve admitting water to the empty pipes, a coiled spring, intermediate mechanism between the spring and the valve, a detent holding the spring, a piston intercepting the flow of water into the normally full sprinkler-pipes, an enlarged chamber into which the piston passes and a mechanical connection between the piston and the detent; all combined with each other substantially as and for the purpose set forth.

7. In an automatic sprinkler system, one or more sprinkler-pipes which are kept full of water, one or more empty sprinkler-pipes, a valve connecting the full and the empty pipes, a coiled spring which acts to open the valve, a mechanical connection between the spring and the valve, a detent which holds the spring from action, a source of water-supply, a piston interposed between the source of supply and the full pipes, a piston-rod, an electric circuit which is held open by the piston-rod and closes with its inward motion and means of releasing the detent actuated by the electric circuit; all combined with each as and for the purpose set forth.

8. In a system of automatic sprinklers, one or more sprinkler-pipes which are kept full of water, one or more empty sprinkler-pipes, a valve between the full and the empty pipes, a spring acting to open the valve, a detent holding the spring, a piston intercepting the flow of water to the full pipes, a mechanical connection between the piston and the detent, an electric circuit, a series of circuit-closing thermostats in the neighborhood of the empty pipes, and means of releasing the detent controlled by the electric circuit, all combined with each other as and for the purpose set forth.

9. In an automatic sprinkler system the combination of a source of water-supply, one or more sprinkler-pipes connected therewith, one or more empty sprinkler-pipes, a valve connecting the empty pipes with the source of water-supply, a spring acting to open the valve, a detent holding the spring, a piston interposed between the source of supply and the full pipes, an electric circuit, a circuit-closer therefor actuated by the motion of the piston, a series of circuit-closing thermostats in the neighborhood of the empty pipes, a branch of the electric circuit passing therethrough and means of releasing the detent actuated by the electric circuit; all combined with each other as and for the purpose set forth.

10. In a system of automatic sprinklers a source of water-supply, one or more empty sprinkler-pipes, a valve connecting the pipes with the source of supply, a spring acting to open the valve, a detent holding the spring, a cylinder closed at the end, a piston fitting the cylinder, a piston-rod connected with the detent, an explosive charge inclosed below the piston, an electric circuit passing through the charge and adapted to explode it by its heating effect, and one or more circuit-closers; all in combination with each other substantially as and for the purpose set forth.

11. In a system of automatic sprinklers a source of water-supply, one or more full sprinkler-pipes, a piston interposed between the source and the full pipes, a chamber into which the piston passes, one or more empty sprinkler-pipes, a valve connecting the empty pipes with the source of supply, a spring acting to open the valve, a cylinder closed at the ends, a piston moving therein, a piston-rod passing through both ends of the cylinder and acting at one end as a detent for the spring, intermediate mechanism transmitting to the other end of this piston-rod the motion of the piston interposed between the source of water-supply and the full pipes, an explosive charge in the cylinder, an electric circuit passing through the charge and adapted to ignite it, and means of closing the circuit at points protected by the empty sprinkler-pipes; all combined with each other substantially as and for the purpose set forth.

12. In a system of automatic sprinklers a water-tank, a cylinder projecting from the bottom of the tank, a piston working therein, an enlarged chamber into which the piston passes, sprinkler-tubes leading out therefrom, a piston-rod rising through the tank, a whistle or other alarm, an actuating-cord attached thereto, a weight attached to the other end of the cord, rollers projecting from the side of the weight, a forked lever on which the rollers rest and a mechanical connection between the inner end of the lever and the upper end of the piston-rod; all in combination with each other as and for the purpose set forth.

13. In a system of automatic sprinklers a piston intercepting the flow of water thereinto, a cylinder, an enlarged chamber into which the cylinder gradually changes, an alarm which is actuated by the first motion of the piston and a second alarm which is actuated by the piston when the flow of water has become sufficient to carry the piston into the enlarged chamber; all combined with each other as and for the purpose set forth.

14. In a system of automatic sprinklers, a source of water-supply, one or more empty sprinkler-pipes, a valve connecting the pipes with the source of supply, a sprocket-wheel upon the valve-stem, a second sprocket-wheel upon a shaft at a distance, a chain connecting the two sprockets, a spring coiled about the shaft, a hand-wheel for coiling the spring, a detent entering the rim of the hand-wheel, an automatic release for the detent; all combined with each other as and for the purpose set forth.

15. In a system of automatic sprinklers a source of water-supply, one or more empty sprinkler-pipes, a valve connecting the pipes with the source of supply, a spring acting to open the valve, a hand-wheel by which the spring is coiled, an alarm actuated by the reverse motion of the hand-wheel and an automatically-controlled detent for the spring; all in combination with each other as and for the purpose set forth.

16. In an automatic sprinkler system a source of water-supply, two or more sprinkler-pipes separately connected with the source of supply, a separate piston which intercepts the flow of water into each separately-connected pipe, and an alarm actuated by each piston which is distinguishable from that attached to either of the others; all in combination with each other as and for the purpose set forth.

17. In an automatic sprinkler system an alarm, an actuating-weight connected therewith, supporting-rollers for the weight, a pair of forked levers on which the rollers rest, one or more sprinkler-pipes, a piston intercepting the flow of water into the pipes, a mechanical connection between the piston and one of the forked levers, a piston which supports the inner end of the other forked lever, a cylinder in which this piston moves freely, an explosive charge below the piston, a conducting-fuse in the charge, an electric circuit passing through the fuse and one or more circuit-closers; all in combination with each other as and for the purpose set forth.

18. In a system of automatic sprinklers a source of water-supply, an empty sprinkler-pipe, an automatically-controlled valve between the source of supply and the pipe, a U-shaped bend in the pipe, a drainage-tube leading down from the lowest point of the bend, an internal valve which closes the outlet of the drainage-tube, a spiral spring which supports the weight of the internal valve, and a perforated adjusting-cap at the lower end of the drainage-tube; all combined with each other as and for the purpose set forth.

In testimony whereof I have signed my name to this specification in the presence of two subscribing witnesses.

HOWARD F. MAXIM.

Witnesses:
E. C. PACK,
FRED B. MERRILL.